United States Patent Office 3,538,548
Patented Nov. 10, 1970

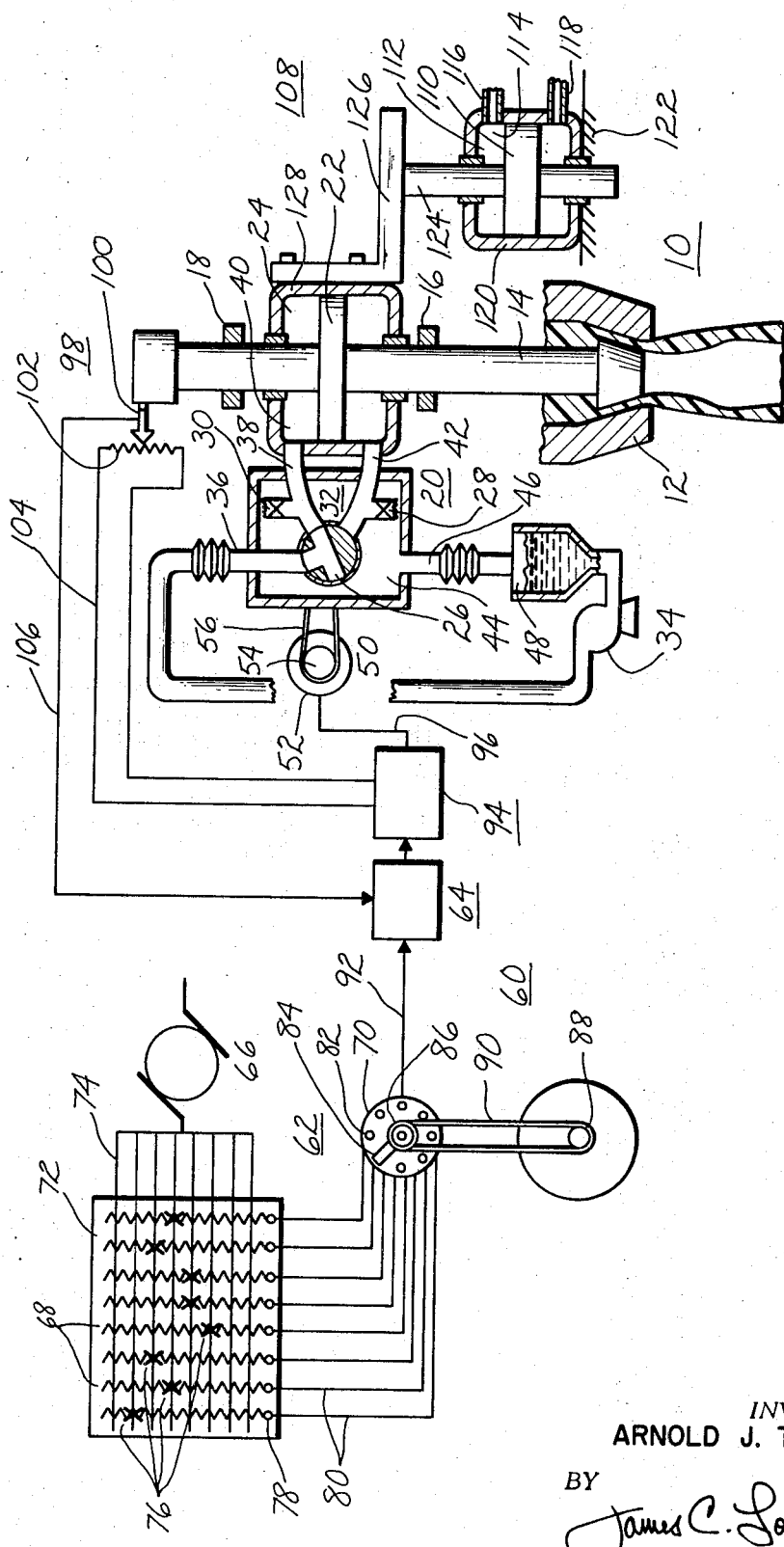

3,538,548
CONTROL APPARATUS FOR VARYING
PARISON THICKNESS
Arnold J. Tenner, West Haven, Conn., assignor to Monsanto Company, St. Louis, Mo., a corporation of Delaware
Filed May 19, 1967, Ser. No. 639,686
Int. Cl. B29d 23/04
U.S. Cl. 18—14                                      7 Claims

ABSTRACT OF THE DISCLOSURE

This disclosure relates to method and means for controlling the material distribution of a plastic parison during extrusion by a control system used to vary the opening of the extrusion outlet.

BACKGROUND OF THE INVENTION

The present invention relates to the extrusion of parisons and more particularly to the control of parison thickness.

The cost and weight of materials used to manufacture plastic containers makes it necessary to control the distribution of material making up the contianer. In the past, excessive amounts of material had to be used for parison wall thickness to compensate for weak areas resulting from uneven stretching during molding of the container. More recently, it has been found that the extrusion of the parison in blow molding processes can be controlled to some extent by varying the size of the opening of the extrusion outlet or the pressure at the outlet. The opening of the extrusion outlet has been varied by raising or lowering a portion of the die by some sort of mechanical system. This mechanical system generally consists of a cam which regulates the movement of a movable portion of the die during the extrusion of the parison thereby varying the parison thickness. Although these methods represent a significant improvement over the previous methods of parison extrusion, it is limited in that the regulation is dependent on cam contour which cannot be effectively adjusted to compensate for changing conditions or even cam wear. Consequently, the inaccuracies and difficulties of control have seriously limited their effectiveness. Now a method has been developed which will effectively control the thickness of the parison and which is accurate, externally adjustable and which may also be self-adjustable.

The principal object of the present invention is to provide a parison having a wall thickness which varies along its axial length in order to produce an article of manufacture during a subsequent molding process having an improved material distribution.

It is another object of the present invention to provide improved means for controlling parison thickness during extrusion.

It is another object of the present invention to provide improved means for regulating parison thickness which can be easily and accurately varied.

It is another object of the present invention to provide improved means for severing the parison from the extrusion unit.

It is another object of the present invention to provide improved means for controlling parison thickness during extrusion according to a predetermined program.

It is a further object of this invention to provide method and means to carry out the above objects.

Other objects of this invention will in part be obvious and will in part appear hereinafter.

These and other objects are attained by extruding a parison through an extrusion outlet defined by a die casing and a pin mounted for axial movement while controlling the wall thickness of the parison by applying a series of varied fluid pressures to move the pin in response to each of these applied pressures. Apparatus for carrying out the above objects comprises a die casing and pin mounted for axial movement defining an extrusion outlet, fluid pressure means for moving the pin, valve means for regulating the fluid pressure means, valve positioning means for positioning the valve means, and control means for regulating the valve positioning means, said control means including pin position cycle program means. If extremely tight control over parison wall thickness variations are desired or necessary for the subsequent fashioning of a plastic article then the control means will also include adjusting means for adjusting differences between observed pin position and programmed pin position and pin position indicator means for observing pin position including means for transmitting said pin position observation to said control means. As an added feature, the present invention may also include secondary pin moving means used to completely or partially sever the parison from the extrusion unit after a cycle of pin movements caused by the control means is completed.

These and other objects of this invention will be apparent from the following description and the accompanying drawing which is a plan view partly in section indicating the extrusion outlet, the pin defining part of the extrusion outlet and means for controlling pin position.

Referring to the drawing, there is schematically shown an extrusion outlet 10 for forming parisons defined by a die casing 12 and a centrally located pin 14 mounted for axial movement through two bearings 16 and 18. Between bearings 16 and 18, there is shown fluid pressure means 20 comprising a piston 22 attached to pin 14 and fluid means 24 used to move piston 22 attached to pin 14, up or down depending on the positions of valve 26, 28 and 30 referred to generally as the valve means 32. As shown in the drawing when the three-way valve 26, is turned in the position illustrated, pump 34 causes fluid to flow under pressure from conduit 36 through the open passageway of valve 26 into the piston chamber 40 above the piston via conduit 38. During this time, valve 30 is closed and valve 28 is open causing piston 22 and pin 14 to move downwardly in reaction to the pressure of the fluid entering chamber 40. Fluid in chamber 40 below the piston 22 flows out of chamber 40 through conduit 42 past open valve 28 into chamber 44. The fluid departs from chamber 44 through conduit 46 into a fluid reservoir 48 from which it may be circulated through pump 34 thus closing the fluid circulation system. Piston 22 may be moved upwardly by reversing the procedure, that is, by changing the valve positions such that valve 26 is turned closing off conduit 38 and opening conduit 42 while at the same time closing valve 28 and opening valve 30. The flow of fluid from the valve 26 through the piston chamber 40 is thus reversed causing the pin 14 to move upwardly.

Also shown in FIG. I are valve positioning means 50 for moving the valves to the positions described above.

In this illustration the valve positioning means comprise a motor 52 of any suitable type operating to rotate a sprocket 54 which is used to drive a chain 56 linked to turning members (not shown) on each of the valves shown. The valve positioning means 50 is regulated by control means 60.

Control means 60 includes a pin position cycle program means 62 and adjusting means 64. In brief, the pin position cycle program means comprises a direct current power source 66, a plurality of resistors 68 and a scanner 70. More specifically, the plurality of resistors 68 as shown in the drawing are laid out parallel to each other on a board 72. Crossing transversely in front of the plurality of resistors 68 are a plurality of wires 74 connected to the direct current power source 66. By connecting any one of the parallel plurality of wires 74 to any one of the plurality of resistors 68 where they cross, for example, at points 76 indicated by X's, a current will flow from the power source 66 to each of the crossed resistors. This will result in an individual potential drop for each connection determined by the distance between the crossed points 76 and terminals 78. More specifically, each of the conductive lines 80 emanating from terminals 78 will have a current flow in proportion to the distance of the resistor in the line between terminals 78 and the direct current power source 66.

Each of the conducting lines 80 extend from a terminal 78 to a separate terminal 82 located on scanner 70. Scanner 70 is also provided with a conductor arm 84 which is rotated to contact each of the terminals 82 in sequence and is rotated by a connecting sprocket 86 which is in turn rotated by a driving sprocket 88 by means of drive chain 90. As the conductor arm 84 contacts each terminal 82 a current will flow from that terminal through the conductor arm 84 and along lead 92 to the adjusting means 64 connected to an amplifier 94 which in turn transmits an amplified current through lead 96 to the valve positioning means 50 used to position the previously described valves 26, 28 and 30. The use of the amplifier will depend primarily on the power required to regulate the valve positioning means. If an amplifier is used it may, of course, be placed before or after the adjusting means, as long as the intent of the circuitry is maintained.

When the flow of current reaches the valve positioning means 50, the valve positioning means will react depending either on the magnitude of the current, the direction of the current or both to position the valves causing piston 22 to move the pin 14 to a new position. Almost instantaneously, pin position indicator means 98 notes each incremental movement of the pin. This is accomplished in the illustrated embodiment by the movement of a rigidly fixed indicator 100 across a resistor 102 in the closed circuit 104 leading from and to the amplifier 94. A portion of the current in circuit 104 will flow through the indicator and along the conductive lead 106 to the adjusting means 64 at a magnitude dependent on the position of the indicator on the resistor. Since the position of the indicator 100 along the resistor 102 is determined by the actual position of pin 14, the magnitude of the current flow along the conductive lead 106 will be proportional to actual pin position. The adjusting means 64 then compares the signal or current flow received from the pin position cycle program means with the signal or current flow received from the pin position indicator means and transmits an adjusted signal or current through the amplifier 94 and hence to the valve positioning means 50 causing a second pin movement or modification of the applied pressure. This second pin movement or adjustment is designed to bring the difference between the signals from the pin position cycle program means and the pin position indicator means into a prescribed range. It is obvious, of course, that if the difference obtained in the first pin movement is within the prescribed range, the adjusting means will not cause a second pin movement or modification of the applied pressure.

In the operation of the above-described apparatus, the operator will set up the programming means to produce a predetermined shaped parison, i.e., a parison having longitudinally varying wall thickness in accordance with a predetermined plan. This is done by connecting selected conductive leads from the power source to selected resistor lines such as shown at the points 76 indicated by X's in the drawing. During extrusion, the scanner will be activated to transmit a current in sequence from the output terminal of each resistor 68 which is proportional to its voltage drop which in turn is dependent on the distance between the connection of the conductive lead end resistor and terminal. In general, one rotation of the scanner arm is set to correspond with the changes necessary to produce one parison referred to herein as one cycle, although it may be possible to set the board to produce more than one parison or cycle upon one rotation of the scanner arm. As described heretofore, the current transmitted by the scanner to the adjusting means or amplifier will in turn cause pin movements affecting the wall thickness of the parison relatable to the voltage drop of the resistor. If it is desired to change the wall thickness of the parison during the extrusion operation, it can be easily done by simply disconnecting any of the conductive lines, i.e., 74, from the resistor and reconnecting the conductive line to another resistor. The connection may be by pin or any other suitable means to insure contact between the conductive line and the resistor. In summary, the operator is able to control the incremental longitudinal wall thickness of the parison as desired, and to make rapid changes in wall thickness program during the extrusion operation, whenever it is felt advisable.

The pin or the die casing opening may be of any shape such as oval, rectangular, grooved and the like, such that the circumferential wall thickness of the parison is relatable to the extrusion outlet and longitudinally variable in accordance with pin movements. It is possible to use an alternating current power source instead of a direct current power source feeding the programming means. However, in terms of circuit simplicity and safety, direct current is preferred. If alternating current is utilized, however, it could be converted to direct current at any later stage of the system.

An added feature of the present invention is also shown in the drawing whereby a second pin moving means 108 is used to completely or partially sever the parison. This may be referred to as a secondary pin moving means to distinguish from the primary pin moving means described above. More specifically, after a cycle of pin movements as determined by the scanner 70 is completed, a parison portion intended for a subsequent molding or shaping operation is formed having highly defined varying wall thicknesses along its length. The complete or partial severing of this parison portion from the extruder outlet may then be accomplished by means of the second pin moving means 108 which comprises a piston 110 acted upon by fluid means 112 entering or leaving piston chamber 114 through conduits 116 or 118. Chamber 114 is surrounded by a casing 120 attached to an immovable platform 122. The upper part of the piston shaft 124 is attached to a stanchion 126 which is in turn attached to the casing 128 of the first described piston chamber 40. In operation movement of piston 110 by fluid means 112 downwardly will cause the entire assembly of chamber casing 128, pin 14 and valve means 20 to move downwardly causing the bottom of the pin 14 to approach the casing wall 12 defining the outer edge of the extrusion outlet 10 thereby resulting in either a complete or partial severing of the parison at this point. It is preferred that the fluid means 112 be of a compressible nature, i.e., gas to minimize possible damage to the pin if contact is made with the die casing wall. The second pin moving means is timed to actuate after completion of the primary cycle of pin position movements as previously described. This may be accomplished by receipt of a signal from the scanner after one cycle rotation or by some mechanism associated therewith such as a relay, cam or any of the conventionally known cycle timers.

As previously described, the basic apparatus used to carry out the present invention comprises a die casing and a pin mounted for axial movement defining an extrusion outlet, fluid pressure means for moving the pin, valve means for regulating the fluid pressure means, valve positioning means for positioning the valve means and control means for regulating the valve position means with the control means including pin position cycle program means. The die casing and the pin may be of any configuration defining a extrusion outlet. The fluid used in the fluid pressure means may be either liquid or gas although a liquid is preferred for more rapid system response. Where a secondary pin moving means is employed to sever the parison, the fluid may also be a liquid or gas except that a gas is generally preferred in this latter instance to minimize the possibility of pin damage. Pin damage may occur by the impact of the pin against the die casing during the severing operation. A gaseous fluid system is substantially more compressible than liquid such that much of the force of impact if it occurs, would be dampened.

The valve means and the valve positioning means may be of any type sufficient to cause hydraulic piston movement as directed by the control means. In some instances, it may be desirable to adjust the rates of valve movements to insure fluid flows on both sides of the piston which will provide rapid response to the control means while at the same time avoiding sudden jarring of the piston or a piston response which is too slow to carry out the purpose of the invention.

The basic part of the control means is the pin position cycle program means. The pin position cycle program means is in effect a system whereby a series of voltages of different magnitudes are created which are in proportional relationship to the various primary pin movements desired. In general, the production of one parison for a subsequent container manufactured during the extrusion operation may require anywhere from 3–100 voltage changes depending on the particular configuration of the container point in the practice of the invention the number of voltage changes will more generally be in the order of 7–40. As a practical matter, this highly complex system tends to become impractical if the number of voltage changes per manufactured container is less than 7 since the purpose of the present invention is to provide increment control of the parison wall thickness during extrusion to produce containers having maximum structural characteristics with a minimum amount of material. The variation in voltage levels may vary to any extent particularly since it may be later amplified to any level of magnitude. In one programming network, voltage variations from 0.25 to 15 volts were used which were later amplified by a factor of ten to actuate the hydraulic system.

For manufacture of small containers (other than bulk shipping containers) the overall extent of pin movement will generally vary anywhere from $3/_{30}$ to ¼ inch with more typical variations from ⅛ to $3/_{16}$ of an inch. Individual pin movements in response to a single voltage change will generally vary anywhere from $5/_{1000}$ of an inch to $300/_{1000}$ or more typically from $100/_{1000}$ to $200/_{1000}$ of an inch.

If the nature of the article to be produced requires an extremely finite control of parison wall thickness, it is essential that the system be continuously monitored to insure that the movements are within the close tolerances desired since the slightest of error will probably result in structurally deficient articles of manufacture. Consequently, an indicator system is provided to observe the actual pin position during and after each individual pin movement. Any suitable pin position observing means may be employed as long as it is accurate and capable of transmitting the actual pin position to the adjusting means. The adjusting means is a system whereby the signal representing the actual pin position is compared with the signal from the pin position program means and which will generate an overriding signal to the control means to either modify the applied pressure to retard or advance the pin during movement or to cause the pin to move again to compensate for any pin movement errors or to bring the pin position into the tolerance range required.

As mentioned previously, a second pin moving means may be used to completely or partially sever the parison. This secondary pin movement should be timed to actuate after the primary pin movement cycle has been completed. As previously indicated, any suitable timing means in association with the primary pin movement cycle may be employed. In operation, the secondary pin moving means would cause the pin, piston and casing assembly of the primary pin moving means to move upwardly or downwardly in unison.

The present system provides highly refined method and apparatus for producing plastic articles of manufacture whose wall thicknesses are closely designed to provide the maximum in structural properties. This system permits control of material distribution determined according to a preconceived plan and which may also be self-regulating in accordance with a plan. Furthermore, the system allows changes to be made in the programming unit during actual extrusion operation. The advantages of this method of parison extrusion increase substantially for the manufacture of the more complex shaped articles. For example, containers of varying diameters or varying designs can now be manufactured without utilizing excesses of material making up the container.

It is obvious that many variations may be made in the apparatuses, processes and products set forth above without departing from the spirit and scope of this invention.

What is claimed is:

1. Apparatus for extruding a plastic parison of varying thicknesses comprising, in combustion, a die casing and a pin mounted for axial movement defining an extrusion outlet, fluid pressure means for moving said pin, valve means for regulating said fluid pressure means, valve positioning means for positioning said valve means and control means for regulating said valve positioning means, said control means including a pin position cycle program means.

2. The apparatus according to claim 1 wherein the control means also include adjusting means for adjusting the difference between observed pin position and programmed pin position and pin position indicator means for observing pin position including means for transmitting said pin position observation to said control means.

3. The apparatus according to claim 1 wherein a secondary pin moving means is provided for at least partially severing the parison from the extrusion outlet.

4. The apparatus according to claim 1 wherein the fluid pressure means for moving said pin comprises a piston and fluid means for moving said piston.

5. The apparatus according to claim 1 wherein the pin position cycle program means comprise an electrical power source, a plurality of resistors connected to said power source, and a scanner for transmitting current in sequence from the output of each of the variable resistors to the valve positioning means.

6. The apparatus according to claim 5 wherein the plurality of resistors are aligned substantially planar and parallel to each other and wherein a plurality of conductive leads from the power source are provided aligned substantially planar and parallel to each other, said plurality of resistors and said plurality of conductive leads being positioned in substantially adjacent planar relationship whereby any one of the conductive leads may be connected to any one of the resistors.

7. Apparatus for extruding a plastic parison of varying thicknesses comprising, in combination, a die casing and a pin mounted for axial movement defining an extrusion outlet, a first pin moving means for moving said pin, control means for regulating said first pin moving means, and a second pin moving means for causing said pin to move downwardly to at least partially sever the parison in the extrusion outlet from the remainder of the plastic after completion of a pin movement cycle by said first pin moving means.

References Cited

UNITED STATES PATENTS

| | | |
|---|---|---|
| 3,218,672 | 11/1965 | Langecker. |
| 3,186,032 | 6/1965 | Harwood. |
| 3,217,360 | 11/1965 | Mason et al. |
| 3,283,363 | 11/1966 | Turner _____ 18—5 |
| 3,327,350 | 6/1967 | Limbach _____ 18—5 |
| 3,368,241 | 2/1968 | Williams _____ 18—14 |

J. SPENCER OVERHOLSER, Primary Examiner

M. O. SUTTON, Assistant Examiner

U.S. Cl. X.R.

18—5

PO-1050
(5/69)

UNITED STATES PATENT OFFICE
CERTIFICATE OF CORRECTION

Patent No. 3,538,548      Dated November 10, 1970

Inventor(s) Arnold J. Tenner

It is certified that error appears in the above-identified patent and that said Letters Patent are hereby corrected as shown below:

Column 1, line 26, "contianer" should read - - - container - - -.

Column 6, line 40, in Claim 1, "combustion" should read - - - combination - - -.

Signed and sealed this 13th day of April 1971.

(SEAL)
Attest:

EDWARD M. FLETCHER, JR.
Attesting Officer

WILLIAM E. SCHUYLER, JR.
Commissioner of Patents